Figure 1:
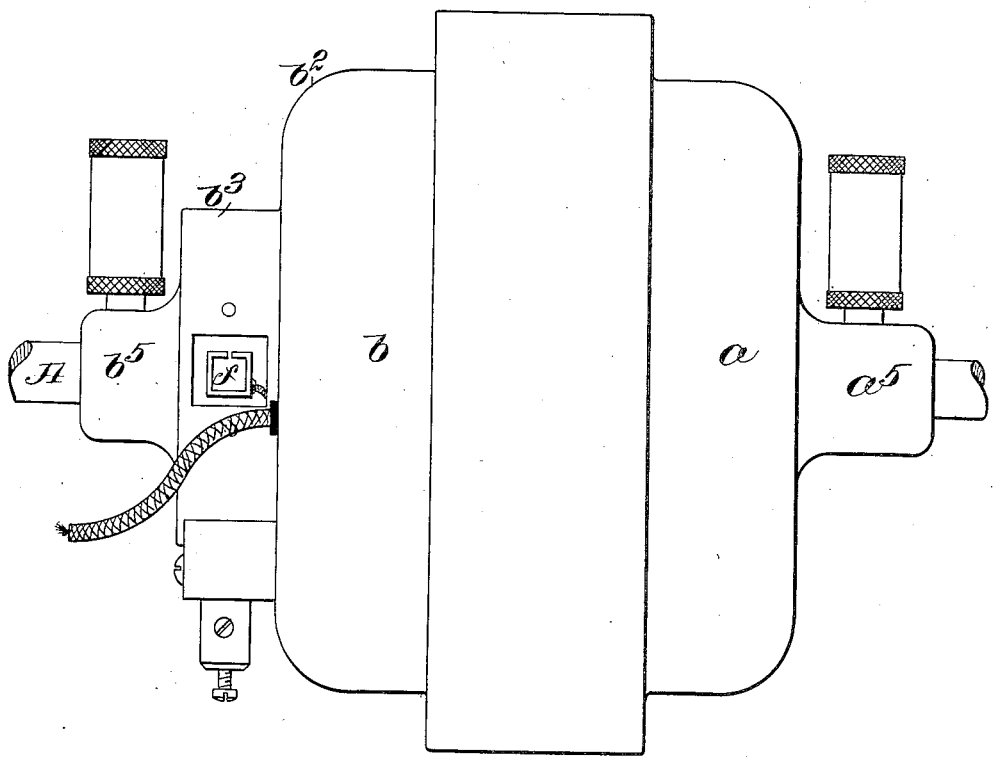

H. A. BALCOME & A. FREIER.
DYNAMO ELECTRIC MACHINE.
APPLICATION FILED FEB. 10, 1908.

931,556.

Patented Aug. 17, 1909.
2 SHEETS—SHEET 1.

Witnesses:
Jas. J. Maloney.
M. E. Rodney.

Inventors:
Herbert H. Balcome,
& Anton Freier,
by J. P. and H. Livermore,
Attys.

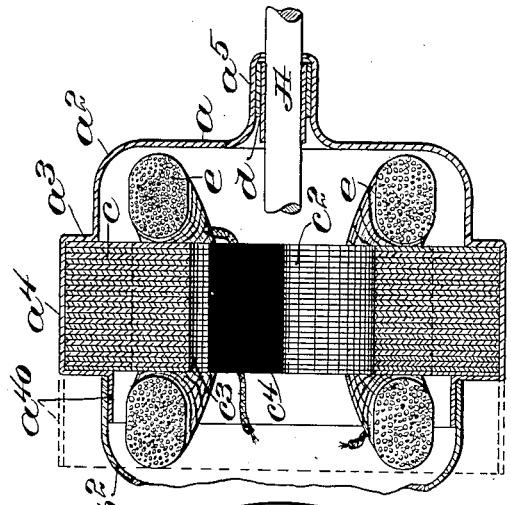
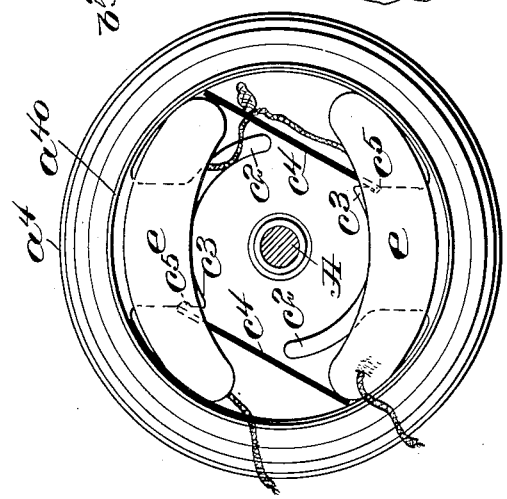
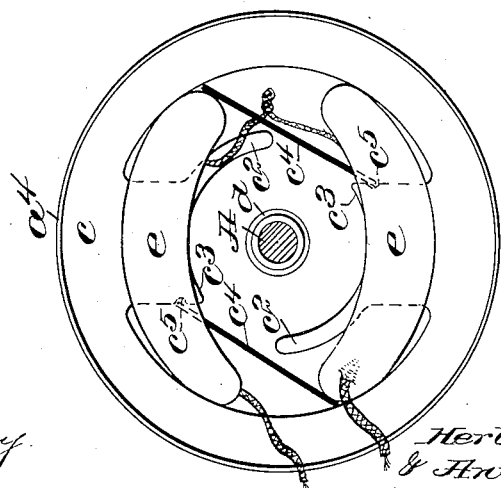

UNITED STATES PATENT OFFICE.

HERBERT A. BALCOME AND ANTON FREIER, OF BOSTON, MASSACHUSETTS, ASSIGNORS TO HOLTZER-CABOT ELECTRIC COMPANY, A CORPORATION OF MASSACHUSETTS.

DYNAMO-ELECTRIC MACHINE.

No. 931,556.     Specification of Letters Patent.     Patented Aug. 17, 1909.

Application filed February 10, 1908. Serial No. 415,209.

*To all whom it may concern:*

Be it known that we, HERBERT A. BALCOME and ANTON FREIER, both residing in Boston, in the county of Suffolk and State of Massachusetts, have invented an Improvement in Dynamo-Electric Machines, of which the following description, in connection with the accompanying drawings, is a specification, like letters on the drawings representing like parts.

The present invention relates to a dynamo electric machine, and is embodied in a novel construction and arrangement especially adapted for use in the manufacture of small motors.

In accordance with the invention, the motor frame or casing is composed of sheet steel shaped by a drawing process, or otherwise, to form an inclosing case which supports the armature bearings and also the field members and the coils, there being no fastening devices required to hold the parts together. The field is composed of two members each forming one part of an inclosing case and each having extended portions adapted to support bearing bushings for the armature shaft. One of the said members is provided with a shoulder and flange which form a receptacle for the field core which is preferably laminated, and the said member after the insertion of the field laminæ is then bent over to clamp the laminæ in place, and also bent outward to form a supporting flange upon which the other member is fitted.

Figure 1 is a side elevation of a motor embodying the invention; Fig. 2 is an end elevation of one member of the field frame with the field laminæ and coils in position before the said member has been completed to clamp the field laminæ in place; Fig. 3 is a similar view of the field member completed; and Fig. 4 is a vertical, longitudinal section of the motor with part of the casing broken away.

The motor casing is made entirely of sheet steel which is shaped preferably by a drawing process, and consists of the member $a$ which affords the support for one armature bearing, the field laminæ and the coils, and the member $b$ which forms a cover or closure to complete the casing, as well as constituting the support for the other armature bearing and the brush holders.

The member $a$ is first made in the shape best indicated by the dotted lines, Fig. 4, having the cup-shaped portion $a^2$ which terminates in an annular shoulder $a^3$ from which extends the annular flange $a^4$, the shoulder and flange affording a seat or recess for the field member which is shown as consisting of the laminæ $c$. The cup $a^2$ is also formed with a tubular extension $a^5$ which constitutes the support for a bearing bushing $d$ for the armature shaft A. To facilitate the insertion of the field coils $e$, the polar extensions $c^2$ are formed at one side only of the pole pieces $c^3$, the two extensions being opposite to each other, as indicated in Figs. 2 and 3. The coils, after being slipped into place, are held by means of clamping members $c^4$ which preferably consist of sheets of fiber board or similar insulating material, one end of which rests against the interior surface of the field member $c$, while the other end is supported in notches $c^5$ formed in the sides of the polar extensions $c^3$ of the laminæ $c$.

When the field portion $c$ and coils $e$ have been placed in position, that portion of the flange $a^4$ which projects beyond the field laminæ (shown in dotted lines, Fig. 4) is bent inward and pressed into position upon the face of the field portion, thus clamping the same securely in position, a portion of the flange $a^4$ being also bent outward to form a flange $a^{40}$ (full lines, Fig. 4) which receives and supports the other member $b$ of the field frame. The said other member is shaped similarly to the member $a$ having a main cup-shaped portion $b^2$ to accommodate the field coils, but being also provided with a cylindrical portion $b^3$ (Fig. 1) which contains the commutator and affords a support for the brush-holders $f$. Beyond the cylindrical portion $b^3$ is the tubular extension $b^5$ which contains the bushing or other equivalent bearing member for the opposite end of the armature shaft A.

Claims.

1. A dynamo-electric machine comprising a sheet steel frame made in two parts, each part being provided with a tubular support for an armature shaft bearing, and with a cylindrical casing portion, one of said parts being provided with an annular recess larger in diameter than the cylindrical casing portion; a field member clamped in said recess between parallel walls thereof; and an annular shoulder smaller in diameter than the recess to receive the other part.

2. In a dynamo electric machine, the combination with a field frame member provided with an annular recess formed in a wall of said frame member; a laminated field portion clamped by a portion of the wall in said recess and provided with polar extremities; coils fitting over said polar extremities; and a second frame member having a tight frictional fit on the frame member above named to inclose the same, substantially as described.

3. A dynamo electric machine having a sheet metal inclosing frame formed in two parts, one of which fits and is frictionally secured upon the other; said other part being provided with an annular recess; supports for the armature shaft formed integral with said parts respectively; and a field member held in place by the walls of said annular recess, substantially as described.

4. In a dynamo electric machine, the combination with a field frame member; of a field portion having pole pieces and oppositely extended polar extremities; coils supported on said pole pieces; and holding devices projecting from the non-extended side of each pole-piece to the side of the frame adjacent to the opposite pole-piece.

In testimony whereof, we have signed our names to this specification in the presence of two subscribing witnesses.

HERBERT A. BALCOME.
ANTON FREIER.

Witnesses:
  JAS. J. MALONEY,
  M. E. COVENEY.